(12) United States Patent
Fillingham et al.

(10) Patent No.: US 11,474,540 B2
(45) Date of Patent: Oct. 18, 2022

(54) AIRCRAFT CONTROL METHOD

(71) Applicant: ROLLS-ROYCE plc, London (GB)

(72) Inventors: David Fillingham, Derby (GB); Marko Bacic, Derby (GB)

(73) Assignee: ROLLS-ROYCE plc, London (GB)

( * ) Notice: Subject to any disclaimer, the term of this patent is extended or adjusted under 35 U.S.C. 154(b) by 30 days.

(21) Appl. No.: 16/907,617

(22) Filed: Jun. 22, 2020

(65) Prior Publication Data
US 2021/0103297 A1    Apr. 8, 2021

(30) Foreign Application Priority Data

Jul. 1, 2019 (GB) .................................. 1909464.8

(51) Int. Cl.
| G05D 1/10 | (2006.01) |
| B64C 29/00 | (2006.01) |
| G08G 5/00 | (2006.01) |

(52) U.S. Cl.
CPC ......... *G05D 1/102* (2013.01); *B64C 29/0033* (2013.01); *G05D 1/1062* (2019.05); *G08G 5/0034* (2013.01)

(58) Field of Classification Search
CPC .. G05D 1/102; G05D 1/1062; B64C 29/0033; G08G 5/0034
See application file for complete search history.

(56) References Cited

U.S. PATENT DOCUMENTS

| 9,365,290 B1* | 6/2016 | Morris .................... B64C 29/02 |
| 2013/0140404 A1 | 6/2013 | Parks |
| 2015/0197335 A1 | 7/2015 | Dekel et al. |
| 2016/0048132 A1* | 2/2016 | Cherepinsky ........ G08G 5/0069 701/4 |
| 2016/0288903 A1 | 10/2016 | Rothhaar et al. |
| 2019/0107408 A1* | 4/2019 | Stroman ............... G05D 1/0005 |
| 2019/0144108 A1 | 5/2019 | McCullough et al. |
| 2019/0225332 A1* | 7/2019 | Burns ..................... B64C 39/08 |
| 2019/0291862 A1* | 9/2019 | Lyasoff ................. B64C 15/02 |
| 2020/0333805 A1* | 10/2020 | English ................ G05D 1/0858 |
| 2021/0276726 A1* | 9/2021 | Kroo .................. B64C 29/0025 |
| 2022/0009626 A1* | 1/2022 | Baharav ................. B64C 39/04 |

FOREIGN PATENT DOCUMENTS

| CN | 106777739 A | * 5/2017 |
| WO | 2016/109408 A1 | 7/2016 |

OTHER PUBLICATIONS

Combined Search and Examination Report of the Intellectual Property Office of the United Kingdom for GB1909464.8 with report dated Dec. 23, 2019 and search date of Dec. 20, 2019.
Dec. 4, 2020 Extended Search Report issued in European Patent Application No. 20181119.7.

* cited by examiner

*Primary Examiner* — Hunter B Lonsberry
*Assistant Examiner* — Harrison Heflin
(74) *Attorney, Agent, or Firm* — Oliff PLC (57) ABSTRACT

A method of automatically determining a flight trajectory of a vertical take-off and landing aircraft having vectorable propulsion can be used to improve flight efficiency. The method includes receiving one or more aircraft flight constraints, inputting the aircraft flight constraints to a trajectory planning algorithm to determine a minimum energy aircraft transition trajectory, and outputting a control schedule to fly the aircraft to along the flight trajectory.

19 Claims, 8 Drawing Sheets

AIRCRAFT CONTROL METHOD

CROSS-REFERENCE TO RELATED APPLCIATIONS

This application claims the benefit of United Kingdom Patent Application No. 1909464.8 filed Jul. 1, 2019, the disclosure of which is herein incorporated by reference in its entirety.

TECHNICAL FIELD

This disclosure relates to a method of control of an aircraft

BACKGROUND

STOL, STOVL and VTOL aircraft are used where take-off and landing distances are restricted, for instance from ships at sea. Conventional VTOL aircraft include helicopters, tilt rotor aircraft and tilt wing aircraft.

In a tilt-wing aircraft, propulsors are mounted to the wings, which pivot such that the wing mounted propulsors provide either lift or forward thrust depending on the position of the wing. Prior tilt wing aircraft are known, such as the XC-142, Vertol VZ-2 Kaman K-16B, Hiller X-18 and the Canadair CL-84.

Tilt-rotor aircraft are also known, for instance the Bell/Boeing V-22. In a tilt-rotor aircraft, the wing stays level relative to the fuselage, while the engines and rotors tilt to transition between hovering and forward flight.

Other VTOL aircraft configurations are also known, such as vectored thrust aircraft, gyrocopters and helicopters, including compound helicopters. In many of these aircraft types, either separate propulsors are provided for lifting and cruise flight, or engines must be tilted relative to the wings or fuselage between lifting and cruise flight. Flight during this "transition" between hovering/lifting flight and forward/cruising flight can be difficult to manage, even for skilled pilots. If VTOL aircraft are to become more commonplace, it will be necessary to reduce the level of skill required to fly these aircraft types. Furthermore, optimisation of the flight profile may be difficult for a human pilot or for a conventional autopilot system, in view of competing demands for efficient flight within the various constraints, such as maintaining stability, altitude etc. Consequently, it is desirable to provide an automated system which automates at least part of the flight regime during transition between hovering and cruising flight in a VTOL aircraft, in order to provide for efficient, safe flight.

SUMMARY

According to a first aspect there is provided a method of determining a flight trajectory of a vertical take-off aircraft having vectorable propulsion, the method comprising:
receiving one or more aircraft flight constraints;
receiving aircraft flight data;
inputting the aircraft flight constraints and aircraft flight data to a trajectory planning algorithm to determine a minimum energy aircraft transition trajectory; and
outputting a control schedule to fly the aircraft to the flight trajectory.

Advantageously, a method is provided which automatically plans an aircraft flight trajectory during the transition phase which minimises the overall energy used during transition. This ensures that the aircraft is operated as efficiently as possible, using aircraft flight data, but within the aircraft flight constraints.

The one or more aircraft flight constraints may comprise one or more of an aircraft flight corridor, an aircraft manoeuvring envelope, and a transition end schedule.

The aircraft flight corridor may comprise maximum and/or minimum permitted altitudes for the transition trajectory, and may comprise a maximum/minimum aircraft slope.

The aircraft manoeuvring envelope may comprise one or more of acceleration limits, roll, pitch or yaw rate limits, speed limits, propulsor power limits, propulsor power rate limits, aircraft orientation limits, wing angle of attack limits and actuator rate limits.

The transition end schedule may comprise a maximum time and/or distance for completing the transition to forward flight.

The method may comprise inputting live aircraft flight data to the trajectory planning algorithm to provide an updated trajectory. The live aircraft flight data may comprise one or more of current or projected speed, altitude, actuator feedbacks and weather data.

The trajectory planning algorithm may comprise an aircraft flight model which relates aircraft flight control inputs to a corresponding computed trajectory. The aircraft flight inputs may comprise one or more of one or more propulsor thrusts, propulsor angles, wing and tail tilt angles, and aircraft flight control surface angles.

The trajectory planning algorithm may comprise a cost function algorithm.

The cost function algorithm may comprise a plurality of computed trajectories, and a total energy consumed by one or more propulsors for each computed trajectory. The method may comprise utilising the cost function algorithm to determine a computed trajectory having a minimum total propulsor energy consumption.

The method may comprise inputting the computed trajectory to the aircraft flight model to determine the control schedule.

The method may comprise outputting the control schedule to an autopilot system to control the aircraft to the control schedule. Alternatively, the method may comprise outputting the control schedule to a user interface to provide flight control input instructions to a pilot.

According to a second aspect, there is provided an aircraft flight control system configured to control an aircraft having vectorable propulsion, the system comprising:
a trajectory controller configured to compute a minimum energy aircraft transition trajectory in accordance with aircraft flight constraints and aircraft flight data in accordance with the method of the first aspect; and
an aircraft flight controller configured to fly the aircraft to the trajectory computed by the trajectory controller.

According to a third aspect, there is provided an aircraft comprising one or more vectorable propulsors and the flight control system of the second aspect.

The vectorable propulsors may be configured to provide vectorable thrust relative to one or more of an aircraft fuselage and an aircraft wing.

In a first embodiment, the aircraft comprises a tilt-wing aircraft comprising one or more propulsors mounted fixedly to a wing, wherein the wing is pivotable relative to the aircraft fuselage. The tilt-wing aircraft may further comprise one or more cruise propulsors mounted fixed to the aircraft, and configured to provide forward thrust.

In a second embodiment, the aircraft comprises a tilt-rotor aircraft comprising one or more propulsors pivotably mounted to a wing, wherein the wing is fixedly mounted relative to the aircraft fuselage. The tilt-rotor aircraft may further comprise one or more cruise propulsors mounted fixedly to the aircraft, and configured to provide forward thrust.

A further aspect comprises a non-transitory medium comprising instructions to carry out the first aspect.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
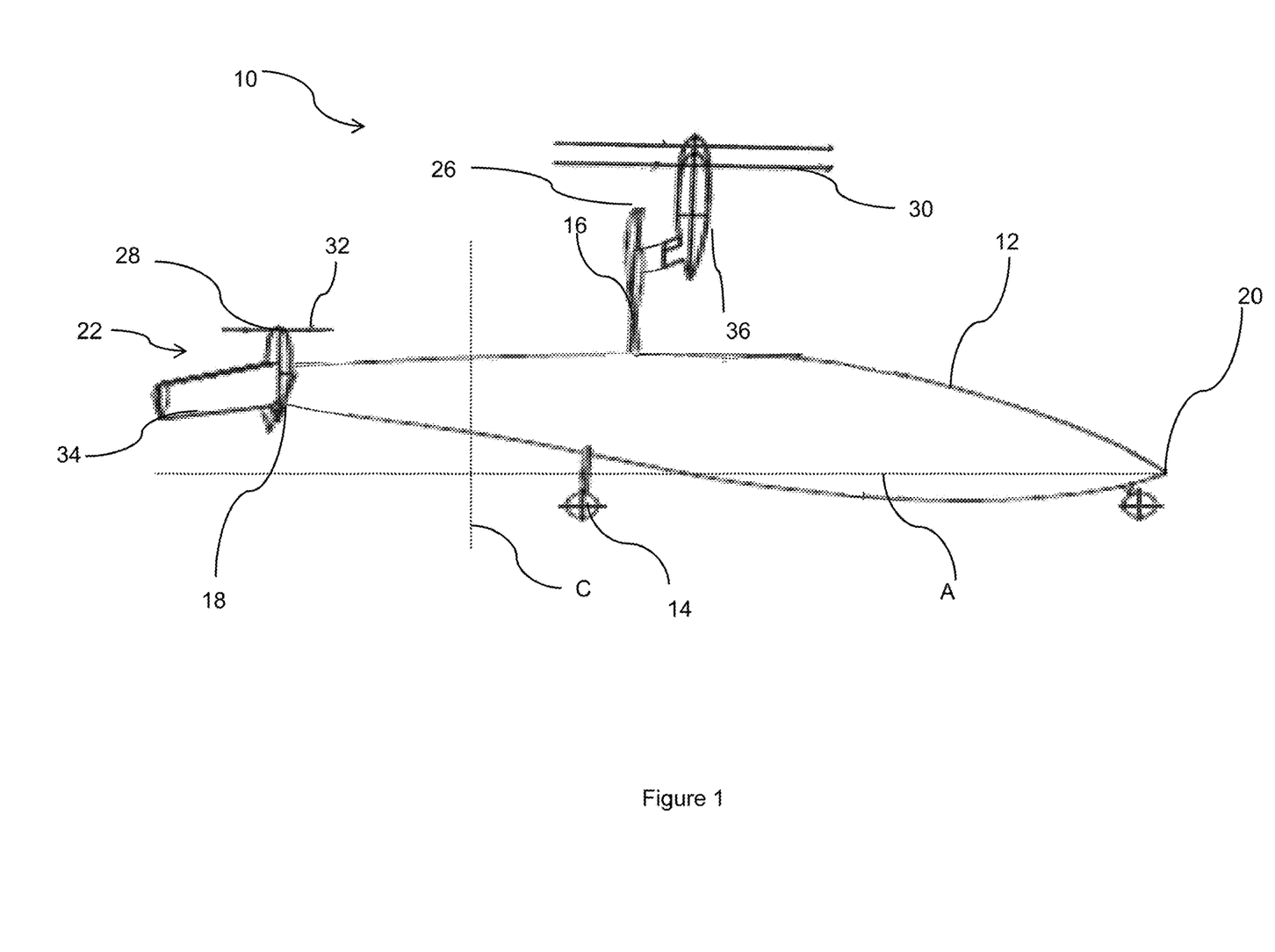
FIG. 1 is a schematic side view of a tilt wing aircraft in a hovering flight mode.
Figure 2:
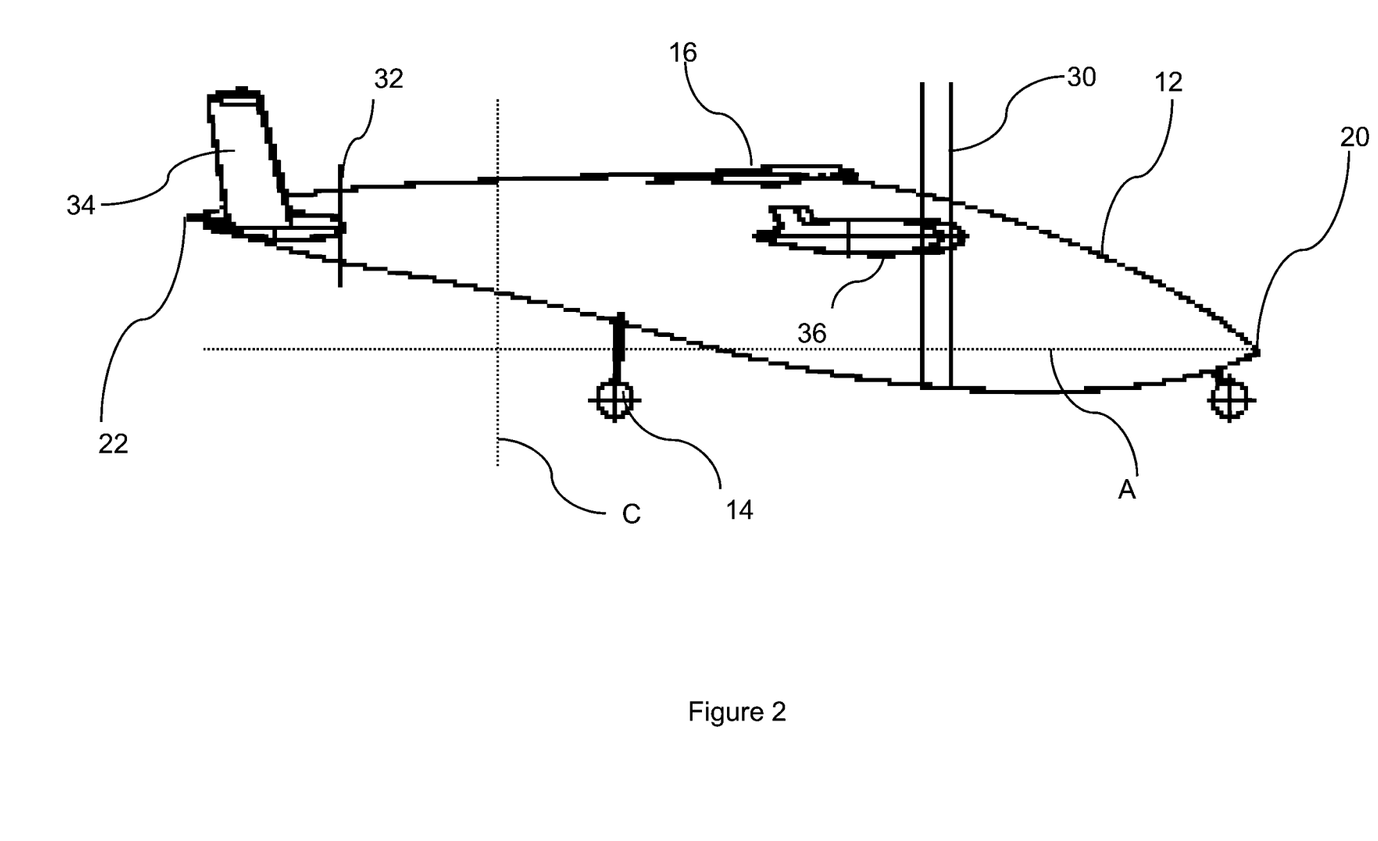
FIG. 2 is a schematic side view of the aircraft of FIG. 1 in a horizontal flight mode.

With reference to FIGS. 1-2, an aircraft 10 is shown. It will be understood that these drawings are illustrative only, and are not to scale. The aircraft comprises a fuselage 12 supported by landing gear 14. The aircraft 10 further comprises a pair of forward main wings 16, which are located such that a centre of lift in flight of the main wings 16 is approximately adjacent a centre of gravity. The aircraft 10 further comprises a tail 22 (also known as an empennage), which comprises horizontal (relative to when the aircraft is in horizontal flight) tail surfaces 18 and vertical (relative to when the aircraft is in horizontal flight) tail surfaces 34 which extend from ends of each horizontal tail surface 18. The fuselage 12 comprises a nose 20, which defines a forward end of the aircraft 10, and the tail 22 which defines a rearward end of the aircraft 10.

Each wing 16 mounts one or more propulsors in the form of propellers 30. Similarly, one or more further propulsors in the form of propellers 32 are mounted to the tail 22. A nacelle 36 is attached to the wing.

As can be seen in the figures, the aircraft 10 defines several directions. A longitudinal direction A extends between the nose 20 and tail 22 in a generally horizontal direction when the aircraft 10 is in level flight or parked on the ground. A lateral direction (not shown) extends between tips of the main wings 16 in a direction normal to the longitudinal axis A in a generally horizontal direction. A vertical direction C extends in a direction generally normal to the ground when the aircraft is in level flight or parked on the ground.

Both the main wings 16 and the horizontal tail surfaces 18 are pivotable together between a vertical flight configuration (as shown in FIG. 1) and a horizontal flight configuration (as shown in FIG. 2). In other words, the main propellers have a fixed angle relative to the main wing 16, with the main wing 16 being pivotable. In the horizontal flight configuration (shown in FIG. 1), the wings 16 and horizontal tail surfaces 18 present respective leading edges 26, 28 toward the forward, longitudinal direction A. The main wing 16 and horizontal tail surface 18 are configured to pivot about the lateral direction to transition to the hovering flight configuration, in which the leading edges 26, 28 are directed upwards, in the vertical direction, as shown in FIG. 1.

During VTOL operation, the aircraft normally starts on the ground with the wings 16 and tail 22 in the hovering configuration, as shown in FIG. 1. The aircraft takes off in a vertical direction (though possibly with some horizontal component also), before transitioning to the horizontal flight mode as shown in FIG. 2. During the transition, the wings 16 and tail 22 pivot slowly from the hovering to the horizontal positions as speed increases. Similarly, for landing, the aircraft transitions once more from the horizontal to the hovering modes. The transition phase for takeoff can be defined as the period between the aircraft wheels leaving the ground, and the aircraft having sufficient forward airspeed to maintain level flight without a vertical thrust component from the propellers 30, 32. Similarly, the transition phase for landing can be defined as the period between the aircraft speed falling below the speed at which level flight can be maintained, and the wheels contacting the ground.

Figure 3:
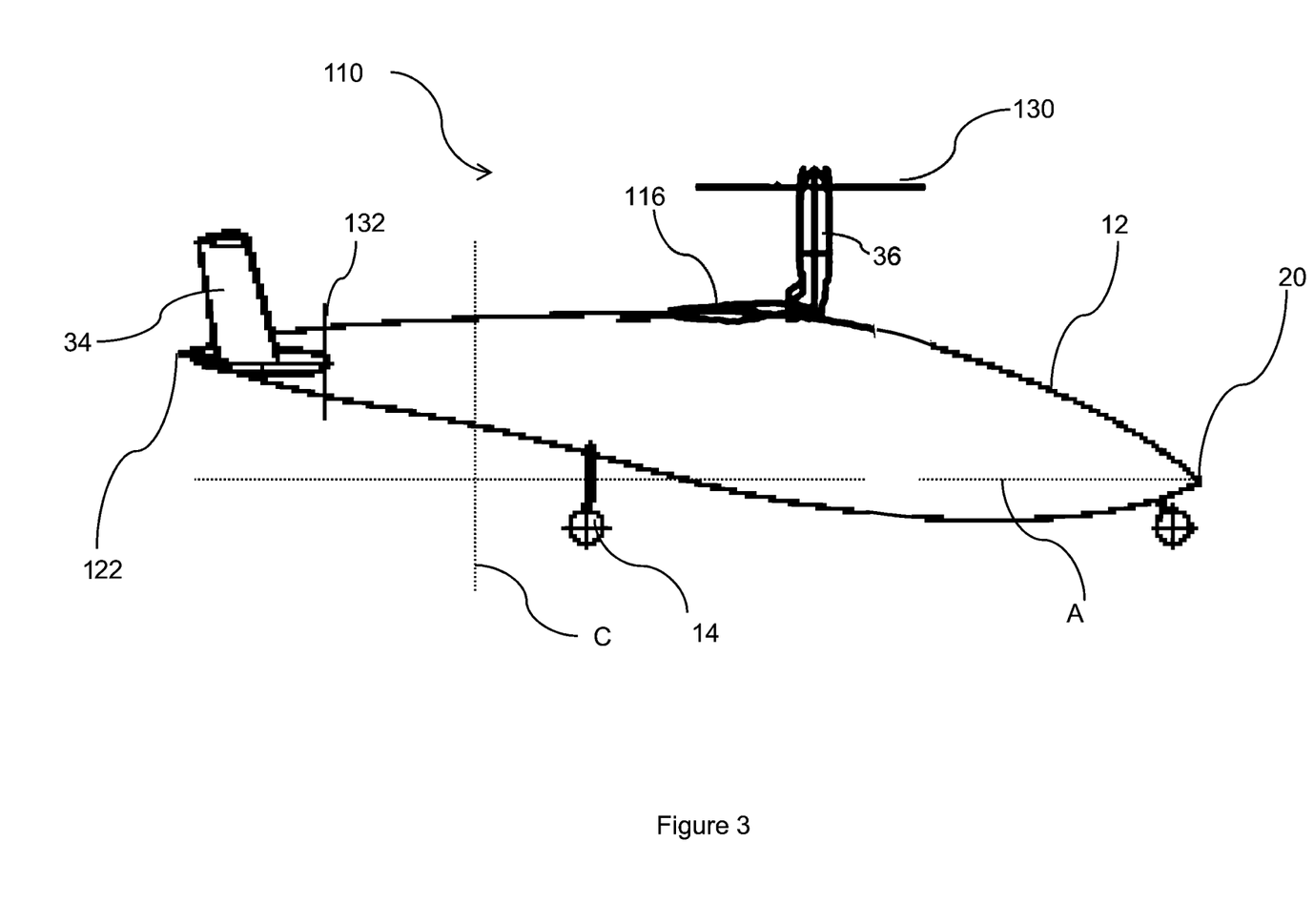
FIG. 3 is a schematic side view of a tilt-rotor aircraft in a hovering flight mode.
Figure 4:
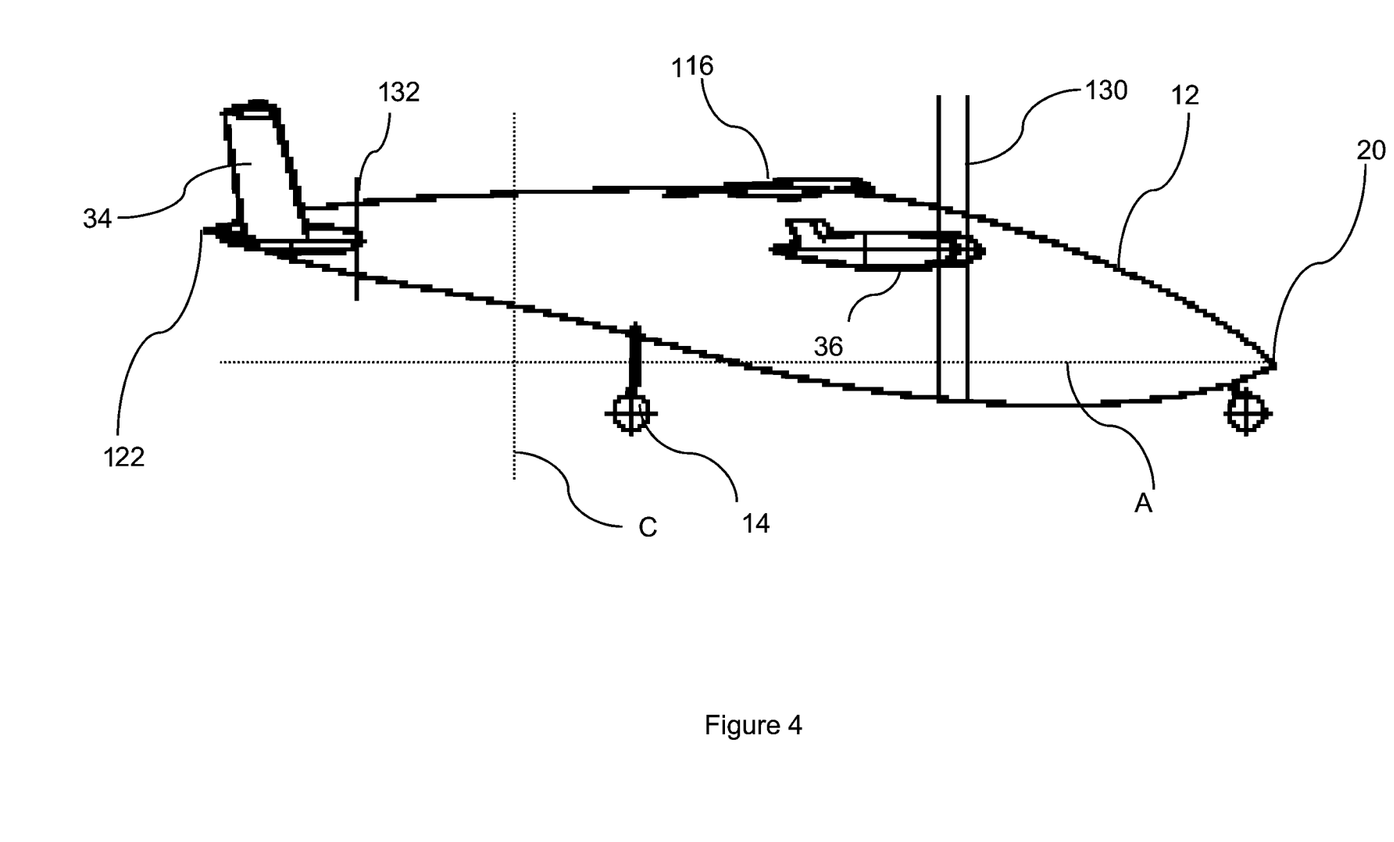
FIG. 4 is a schematic side view of the aircraft of FIG. 3 in a horizontal flight mode.

FIG. 3 shows a second aircraft 110, which is similar to the first aircraft 10, main wings 116 and a tail 122. Main propellers 130 are mounted to the main wings 116, and tail propellers 132 are mounted to the tail 122. The aircraft 110 differs from the aircraft 10, in that the aircraft 110 has fixed wings 116, which do not pivot between hovering and cruise flight. Instead, as can be seen from a comparison of the hovering flight configuration in FIG. 3 and the cruising flight configuration in FIG. 4, the main wing and tail propellers 130, 132 pivot relative to the rest of the aircraft between the hovering and cruising configuration, while the tail 122 and main wing 116 stay level. Such a configuration is known as a "tilt rotor" aircraft.

Figure 5:
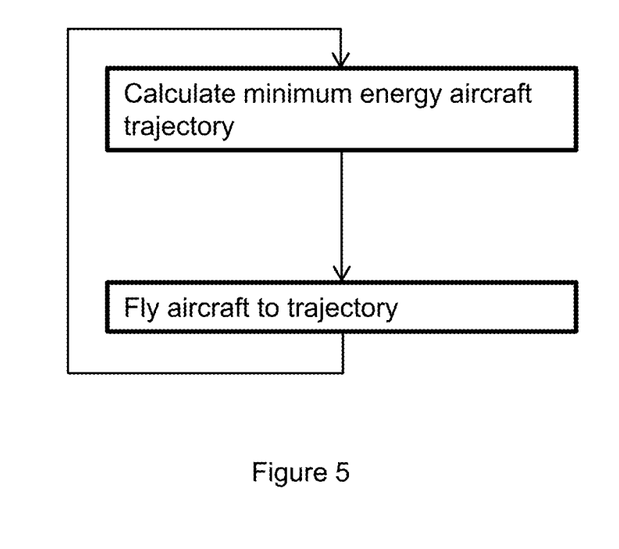
FIG. 5 is a flow diagram illustrating a method of determining an aircraft control schedule of the aircraft of FIGS. 1 and 2 during a transition between the hovering and horizontal flight modes.

FIG. 5 shows an overview of a control scheme for controlling the aircraft 10 during the transition phase, either during takeoff or landing. Briefly, the system is configured to first calculate a minimum energy aircraft trajectory using a reference trajectory controller. An autopilot then translates this reference trajectory into control inputs, to fly the aircraft 10. As the aircraft 10 flies the trajectory, the trajectory is updated based on the actual trajectory flown, to recalculate a new minimum aircraft trajectory.

Figure 6:
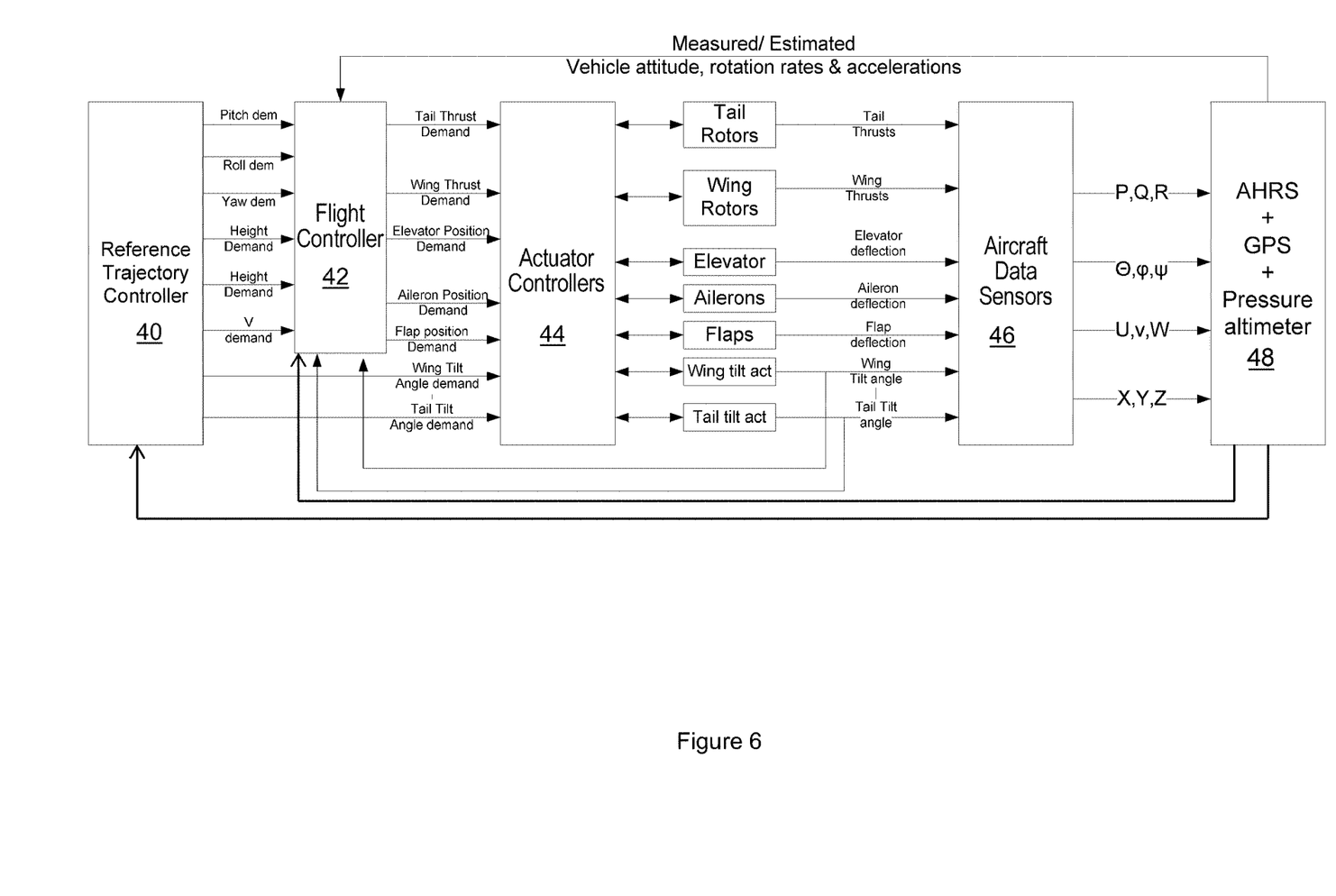
FIG. 6 is a flow diagram illustrating the method of controlling an aircraft.

FIG. 6 illustrates the system architecture in more detail. The system includes a reference trajectory controller 40. The reference trajectory controller determines an optimum aircraft trajectory during the transition phase (either for takeoff or landing), which minimises the total propulsor energy used for the transition.

Figure 7:
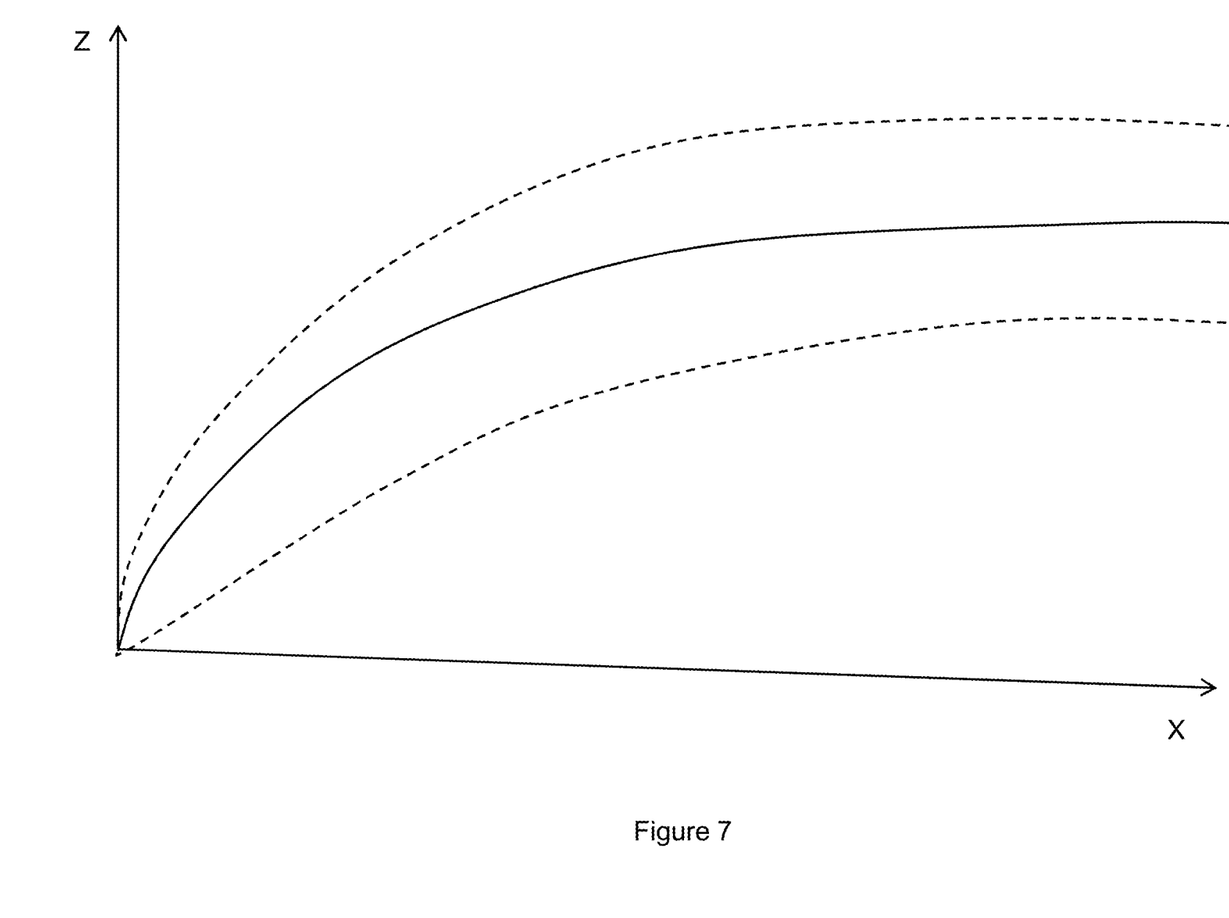
FIG. 7 is an example aircraft trajectory.

The aircraft trajectory controller 40 calculates an aircraft trajectory, as shown in FIG. 7. The trajectory typically comprises a path which the aircraft takes through space in the vertical plane, and may also comprise a path in the horizontal plane.

Once the trajectory is calculated, the aircraft trajectory controller 40 outputs one or more aircraft dynamic commands, which are continually updated as the aircraft progresses through the transition phase. Typically, the dynamic commands include at least a height command and a forward velocity command. Consequently, the trajectory controller translates the aircraft trajectory to a series of height and forward velocity commands, which are broken down into individual time steps. The dynamic commands may also comprise a series of yaw, rolls and pitch commands for each time step.

These dynamic commands are then input to a flight controller 42, which translates the dynamic commands into flight actuator demands. The flight controller comprises an aircraft flight model, which includes a model of how the aircraft will react to a given flight actuator input, and also includes aircraft actuator constraints, such as maximum and minimum flight actuator positions and authority, and maximum propulsor power settings and ramp rates, as well as aircraft dynamic constraints, such as flight surface angles of attack, acceleration, load and stability envelopes. The aircraft flight model typically also includes aircraft configuration variables, such as aircraft weight, as well as atmospheric variables, such as air temperature and pressure altitude. The flight controller determines how most efficiently to achieve the dynamic commands within the aircraft actuator and dynamic constraints. Once this is calculated, the flight controller outputs one or more actuator demands, such as main and tail propulsor 30, 32 demands, elevator, rudder and aileron position demands, flaps demands, and wing and tail tilt demands.

These demands are then translated into actuator position commands by individual actuator controllers 44, which use feedback loops to ensure that the actuators are in the commanded states at the correct times. For instance, an engine controller (not shown) is provided, which translates the required thrust demand to individual motor/engine control parameters to satisfy the thrust demand input from the flight controller 42.

Simultaneously, aircraft data sensors 46 continually sense aircraft dynamic parameters during flight. These data sensors may include air data sensors (such as pitot tubes), which provide air data such as air speeds, altitude etc. Further aircraft data sensors 48 such as aircraft position sensors and attitude sensors (for instance, ARHS, GPS controllers, gyroscopic sensors, and a pressure altimeter, etc) give a full picture of the aircraft ground speed, altitude, position etc. Data from these sensors 46 and 48 is then fed back to the flight controller 42, which updates the flight control demands to take into account deviations from the dynamic commands input to the actuators.

The flight controller 42, actuator controllers 44 and aircraft data sensors 46 and 48 are continually updated, until the trajectory input from the reference trajectory controller is complete, and the transition period ends.

If the aircraft significantly deviates from the optimum trajectory as determined by the reference trajectory controller, data from the aircraft data sensors 46 and 48 is provided to the reference trajectory controller, which calculates an updated optimum trajectory based on the data. The process repeats as necessary, until the transition period ends, whereupon control is handed back to either a conventional autopilot, or to a human operator.

Figure 8:
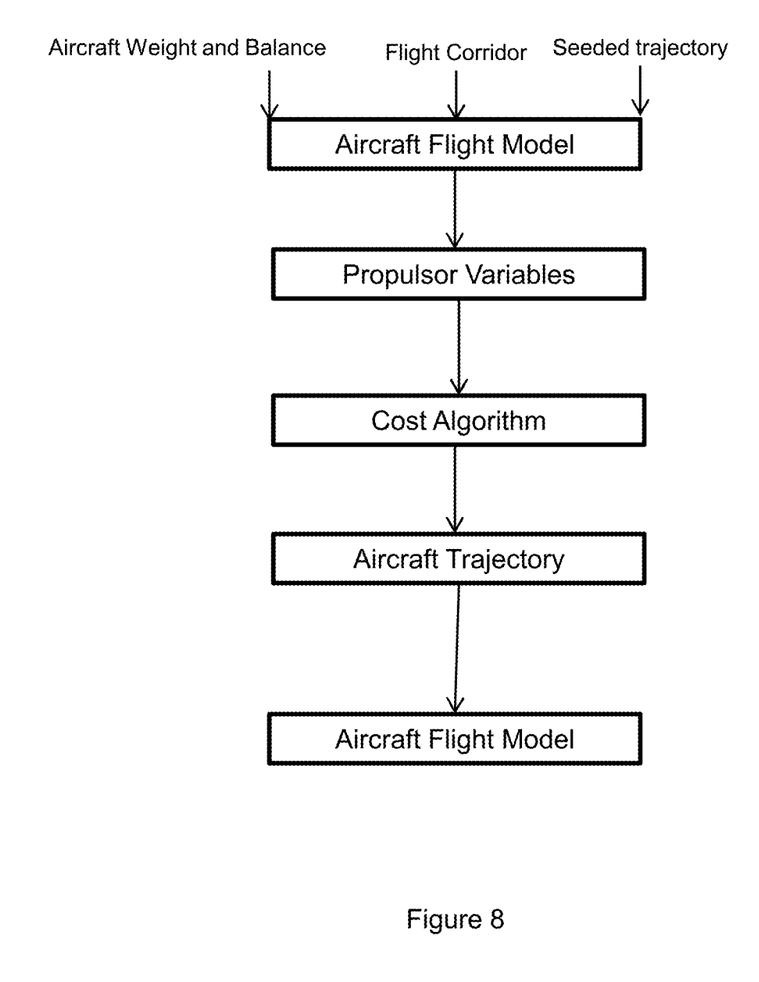
FIG. 8 is a flow diagram showing a method of determining an aircraft trajectory.

FIG. 8 shows in more detail the process by which the reference trajectory is calculated by the reference trajectory controller 40.

The reference trajectory controller 40 aims to provide an aircraft trajectory which minimise energy usage (i.e. fuel burn, electrical energy etc. by the propulsors) during the transition period, within certain constraints.

The trajectory can be represented mathematically in Cartesian coordinates in the vertical plane as a series of positions from a notional origin in the horizontal (x-axis) and vertical (z-axis):

$$x(k|k), x(k+1|k), \ldots, x(k+N|k)$$

$$z(k|k), z(k+1|k), \ldots, z(k+N|k)$$

Where $x(k+i|k)$, $z(k+i|k)$ respectively denote future demands for the vehicle horizontal x and vertical position z at time instant k at i samples ahead, each sample being T seconds into the future. $k+i|k$, denotes, at real time kTs, demand on the vehicle position at time $(k+i)Ts$. In principle, at this stage, the positions x, z can take any value at any given time instant k. N represents the total number of time instants, which will be related to the maximum transition time, and the time resolution of the process.

In calculating this trajectory, bounds for the problem space will generally first be defined. For instance, air traffic constraints may define a "flight corridor" for the aircraft, i.e. maximum and minimum heights $C_z$ and distances $C_x$ that the aircraft must fly within for a given position on the ground:

$$\underline{C_x}(k+i|k) \leq x(k+i|k) \leq \overline{C_x}(k+i|k)$$

$$\underline{C_z}(k+i|k) \leq z(k+i|k) \leq \overline{C_z}(k+i|k)$$

Within these constraints, the reference trajectory controller 40 seeks to provide a trajectory which minimises the energy expenditure of the propulsion system over the time horizon of the transition period. In some cases, the above constraints may not be present, such as where the aircraft has sufficient performance for these constraints not to impact the calculated flight trajectory, or where the aircraft is operating in uncontrolled airspace.

FIG. 7 illustrates an example trajectory (shown as a solid line), with the fight corridor defined by maximum and minimum height lines (shown as dotted lines). As can be seen, a variety of potential flight trajectories are possible within the flight corridor.

FIG. 8 illustrates the process of selecting a minimum energy aircraft trajectory in simplified terms. Firstly, an aircraft flight model is generated, which is a state model representing the response of the aircraft over time to inputs, such as control inputs and power inputs. Into this model are entered constraints, e.g. airspace and aircraft constraints such as a bounded airspace, maximum and minimum flight speeds etc. Aircraft data such as takeoff weights may also be added. Finally, an initial seeded trajectory is entered to the flight model.

The flight model is then used to determine propulsor variables necessary to enable the aircraft to follow a given trajectory, in order to calculate an energy cost for the flight trajectory. These propulsor variables are used as the subject of a cost function. The cost function explores the variables of the flight model, to find a set of variables which outputs a trajectory having a minimised energy associated with that trajectory. Details of this system are outlined below.

In order to determine a trajectory, an aircraft flight model is used. The aircraft flight model is of the general form:

$$\dot{X} = f(X, \delta)$$

Where $\dot{X}$ is some future state, X is a current state, and $\delta$ is a control input. For example, a state X can be a position in a coordinate system (such as Cartesian coordinates x, y, z), a velocity v (which may be a ground or airspeed, such as indicated airspeed), an attitude (expressed, say, as an angle), and an angular velocity. Control inputs may comprise aircraft main and tail propulsor 30, 32 thrust, propulsor/wing tilt angle, and flight control surface angles.

In order to determine the future state $\dot{X}$ from the current states and control inputs, a transition function $f(X, \delta)$ in the form of an aircraft flight model is defined. The transition function includes ones or more equations of motion, which describe how the aircraft behaves in response to control inputs over time, and outputs corresponding future state vectors $\dot{X}$. Typical aircraft control models are well known to the skilled person, and are for example, described in detail in Aircraft Dynamics and Automatic Control by McRuer & Graham, Flight Dynamics by Stengel. Other aircraft control models include Dynamic Inversion, described inter alia in "Non-Linear Dynamic Inversion of a Flexible Aircraft" by Ryan James Caverly et al, published in IFAC-PapersOnLine, Vol. 49, Issue 17, 2016, page 338 to 342.

For example, the aircraft model may be of the form:

$$X(k+1) = \begin{pmatrix} x(k+1) \\ z(k+1) \\ V(k+1) \\ \gamma(k+1) \\ \theta(k+1) \end{pmatrix} = f(V(k), \gamma(k), i_w(k), T_w(k), T_t(k))$$

The objective of the transition controller is to provide a feasible trajectory in terms of Airspeed (V), Flight Path Angle ($\gamma$) and wing/tail tilt $i_w$ to transition into horizontal flight over some finite horizon time N, by computing nominal Wing and Tail thrust trajectory. Therefore the system chooses, wing, tail thrusts, speed V and flight path angles as well as wing angles, as manipulated variables:

$$V(k+i|k), \gamma(k+i|k), i_w(k+i|k), T_w(i+k|k), T_t(i+k|k)$$

Further constraints will be imposed on the system. Firstly, the time horizon N for completing the transition must be finite and non-zero, and a maximum time horizon N may be chosen.

Clearly as we want to transition into horizontal flight, it must be the case that the wing & tail tilts over the finite time horizon from vertical to horizontal which can be explicitly expressed for example as $$i_w(k+N|k) \leq X \text{ degrees}$$

Where X<8 degrees is chosen suitable where the VTOL configuration becomes an aircraft configured for forward flight (i.e. the transition period can be said to have ended). Additionally, the speed at the end of the time horizon N must be higher than the stall speed for the wing angle, and so an additional constraint is defined:

$$V(k+N|k) \geq V_{stall}(X)$$

In this example, we have assumed here for simplicity that both tail and wing tilt simultaneously, with $i_w$ denoting wing tilt. The tail may be offset with wing by −5 to 5 degrees depending on design. In other cases, tail tilt may be varied independently of the wing tilt.

One of the important factors in efficient VTOL transition is to keep the effective angle-of-attack well below stall. Consequently the transition controller produces feasible trajectories which ensure that this is the case. The trajectory may also ensure that the angles of attack on the wing and tail $\alpha_w$, $\alpha_t$ are always below some critical angle (usually, around two degrees or more below a stall angle)

$$\alpha_w(k+N|k) \leq \alpha_1$$

$$\alpha_t(k+N|k) \leq \alpha_2$$

The wing and tail angles of attack are functions of speed, corresponding wing and tail thrusts (if the wing is blown by, for example, propellers mounted forward of the wing leading edge), flight path angle, and pitch angle. The total wing and tail thrusts are:

$$T_w(k+i|k)$$

$$T_t(k+i|k)$$

It is an objective of the control method of this embodiment to minimise the total energy consumed by the propulsion system during the transition period. As will be understood, the energy used will be equal to the total power consumed, integrated over time. The total power consumed during transition can be expressed as a function of gas turbine and battery power, $$P_t(k+i|k) = P_{gt}(k+i|k) + P_{bat}(k+i|k)$$

And is related to thrusts via some function $$P_t(k+i|k) = f(T_w(k+i|k), T_t(k+i|k))$$

For a given set of trajectory control system variables V(k+i|k),γ(k+i|k),i_w(k+i|k),T_w(k+i|k), T_t(k+i|k) a corresponding wing propeller 30 power $P_w(k+i|k)$ and tail propeller 32 power $P_t(k+i|k)$ will be required to meet those variables, for a given history. For instance, reducing the wing tilt angle $i_w$ will tend to increase aircraft forward airspeed V over time, but reduce height for a given power $P_w$, $P_t$, and so propulsor power may need to be increased to maintain the aircraft within the flight corridor. Each of these will also affect the total time to complete the transition, and so affect the total energy consumed.

The control system variables V(k+i|k),γ(k+i|k), i_w(k+i|k), T_w(k+i|k), T_t(k+i|k) can be related through the aircraft model, which may be similar to the aircraft model used by the flight controller 32. Consequently, correspondence between actual aircraft behaviour and the projected aircraft trajectory can be assured.

Consequently, a series of control system variable combinations can be explored, and a corresponding wing propeller 30 thrust $T_w(k+i|k)$ and tail propeller 32 thrust $T_t(k+i|k)$ for each time interval can be determined through the aircraft model. This can be translated into a corresponding wing propeller power and tail propeller 32 power, and added to give a total propulsion system power $P_t$ for each time step:

$$P_t(k+i|k) = f(T_w(k+i|k), T_t(k+i|k))$$

This total propulsion power can then be integrated over the transition period, to give total energy consumed.

This control system variable space can be explored by representing the energy consumed by the transition period by a given trajectory to be minimised in an optimisation problem using, for instance, a neural network or other suitable computerised optimisation problem solution, to select a minimum energy trajectory. For instance, a finite-horizon, discrete time linear quadratic regulator algorithm as follows:

$$J = \sum_{i=1}^{N} P_t(k+i|k)^2$$

Where the aircraft is a hybrid aircraft, in which power is drawn from one or more batteries, this may be subject to further constraints, such as battery energy constraints.

The invention claimed is:

1. A method of determining a flight trajectory of a vertical take-off aircraft having a vectorable propulsion device, the method comprising:
receiving one or more aircraft flight constraints;
inputting the aircraft flight constraints to a trajectory planning algorithm to determine a minimum energy aircraft transition trajectory; and
outputting a control schedule to fly the aircraft along the flight trajectory during a transition period,
wherein:
the transition period starts when the aircraft leaves the ground and ends when the aircraft has sufficient forward airspeed to maintain level flight without a vertical thrust component, and during an entirety of the transition period the vectorable propulsion device gradually pivots from a vertical direction to a horizontal direction as a speed of the aircraft increases, or
the transition period starts when the aircraft speed falls below the speed at which level flight can be maintained and ends when the aircraft contacts the ground, and during an entirety of the transition period the vectorable propulsion device gradually pivots from a horizontal direction to a vertical direction as a speed of the aircraft decreases.

2. The method according to claim 1, wherein the one or more aircraft flight constraints comprise one or more of an aircraft flight corridor, an aircraft manoeuvring envelope, and a transition end schedule for the transition period.

3. The method according to claim 2, wherein the aircraft flight corridor comprises maximum and/or minimum permitted altitudes for the transition trajectory.

4. The method according to claim 3, wherein the aircraft flight corridor comprises a maximum/minimum aircraft slope.

5. The method according to claim 2, wherein the aircraft manoeuvring envelope comprises one or more of acceleration limits, roll, pitch or yaw rate limits, speed limits, propulsor power limits, propulsor power rate limits, aircraft orientation limits, wing angle of attack limits and actuator rate limits.

6. The method according to claim 2, wherein the transition end schedule comprises a maximum time and/or distance for completing the transition to forward flight.

7. The method according to claim 1, wherein the method comprises inputting live aircraft flight data to the trajectory planning algorithm to provide an updated trajectory.

8. The method according to claim 7, wherein the live aircraft flight data comprises one or more of current or projected speed, altitude, actuator feedbacks and weather data.

9. The method according to claim 1, wherein the trajectory planning algorithm comprises an aircraft flight model which relates aircraft flight control inputs to a corresponding computed trajectory.

10. The method according to claim 9, wherein the aircraft flight inputs comprise one or more of one or more propulsor thrusts, propulsor angles, wing and tail tilt angles, and aircraft flight control surface angles.

11. The method according to claim 9, wherein the method comprises inputting the computed trajectory to the aircraft flight model to determine the control schedule.

12. The method according to claim 11, wherein the method comprises outputting the control schedule to an autopilot system to control the aircraft to the control schedule.

13. The method according to claim 1, wherein the trajectory planning algorithm comprises a cost function algorithm.

14. The method according to claim 13, wherein the cost function algorithm comprises a plurality of computed trajectories, and a total energy consumed by one or more propulsors for each computed trajectory.

15. The method according to claim 14, wherein the method comprises utilising the cost function algorithm to determine a computed trajectory having a minimum total propulsor energy consumption.

16. A non-transitory computer readable storage medium that stores instructions that control an aircraft to carry out the method of claim 1.

17. An aircraft flight control system configured to control an aircraft having a vectorable propulsion device, the system comprising:
a trajectory controller configured to compute a minimum energy aircraft transition trajectory in accordance with aircraft flight constraints and aircraft flight data; and
an aircraft flight controller configured to fly the aircraft along the trajectory computed by the trajectory controller during a transition period,
wherein:
the transition period starts when the aircraft leaves the ground and ends when the aircraft has sufficient forward airspeed to maintain level flight without a vertical thrust component, and during an entirety of the transition period the vectorable propulsion device gradually pivots from a vertical direction to a horizontal direction as a speed of the aircraft increases, or
the transition period starts when the aircraft speed falls below the speed at which level flight can be maintained and ends when the aircraft contacts the ground, and during an entirety of the transition period the vectorable propulsion device gradually pivots from a horizontal direction to a vertical direction as a speed of the aircraft decreases.

18. An aircraft comprising a plurality of vectorable propulsion devices and the flight control system of claim 17.

19. The aircraft according to claim 18, wherein the plurality of vectorable propulsion devices are configured to provide vectorable thrust relative to one or more of an aircraft fuselage and the aircraft wing.

* * * * *